United States Patent [19]
Rose

[11] 4,377,827
[45] Mar. 22, 1983

[54] SERVO POSITIONING CONTROL SYSTEM FOR A DATA STORAGE APPARATUS

[75] Inventor: Andrew M. Rose, Mountain View, Calif.

[73] Assignee: Memorex Corporation, Santa Clara, Calif.

[21] Appl. No.: 205,680

[22] Filed: Nov. 10, 1980

[51] Int. Cl.³ .............................................. G11B 21/10
[52] U.S. Cl. ........................................ 360/78; 360/77
[58] Field of Search ...................... 360/77, 78, 98, 133, 360/135

[56] References Cited
U.S. PATENT DOCUMENTS 4,072,990  2/1978  Case et al. ............................ 360/77
4,115,823  9/1978  Commander et al. ................. 360/77

*Primary Examiner*—John H. Wolff
*Attorney, Agent, or Firm*—Limbach, Limbach & Sutton

[57] ABSTRACT

A servo system in a disc drive for accessing and maintaining selected data tracks on a stack of discs has a first continuous position signal derived from a pre-recorded surface and a second position signal derived from servo information in sectors of the other discs. The first and second position signals are combined to form a hybrid signal to control the actuators. The hybrid signal is the second signal when the second signal is generated. When the second signal is not generated, the hybrid signal is a modified first signal plus the last known second signal. The modified first signal is the difference between the first signal presently generated and the first signal generated when the second signal was last generated.

4 Claims, 8 Drawing Figures

SERVO POSITIONING CONTROL SYSTEM FOR A DATA STORAGE APPARATUS

BACKGROUND OF THE INVENTION

This invention relates to a servo system in a disc-drive for accessing selected data tracks on disc surface, and more particularly, this invention relates to a servo system wherein a first continuous position signal is generated, and a second position signal is generated from position information stored in sectors of disc surfaces also having data information thereon.

In data storage apparatus of the type using a stack of rotating discs as the recording medium, data is usually recorded in a plurality of concentric data tracks on the surfaces of the discs. The tracks are closely spaced, for example, at 300 tracks per inch, and the data recorded at densities in excess of 5,000 bits per inch. In order to access the recorded data, it is necessary to move a record and playback head (or transducer) to the selected track in which the desired information is stored, and maintain the head precisely over the center of the track with a minimum displacement error in the presence of any possible displacement error for the whole time the information is being read or being written. A typical prior art technique is to dedicate one entire surface of a single disc in the stack of discs to pre-recorded track positioning information. A read-only servo head is associated with said pre-recorded servo disc surface. The read-only head servo head is ganged with other recording and playback heads (data heads) that are associated with the data discs that form the remainder of the stack. As the discs are rotated, a continuous position signal is read from the read-only servo head to indicate the radial position of the data heads relative to the desired data track on the data discs.

In an improvement over the aforementioned prior art system, employing a dedicated servo head and a dedicated servo disc in conjunction with other data heads and data discs, U.S. Pat. No. 4,072,990 additionally employs the technique of embedding additional servo information in sectors of the data discs that contain data information. That patent teaches that while continuous positioning signal from the dedicated servo disc provides high frequency information, other low frequency disturbances, for example, the differential thermal expansion effects between servo head and servo disc and between data heads and data discs produced by change in the ambient temperature, must be detected and corrected. The use of dedicated servo information in sectors of data discs provide such low frequency information. The teaching of that patent is to combine the high frequency information derived from the continuous positioning signal and the low frequency information derived from the intermittent positioning signal generated from servo information embedded in sectors of data discs. For U.S. Pat. No. 4,072,990 the combination of the signal from the continuous servo surface and the information from the sectors of the data discs is achieved by simply providing a low-pass filter for extracting low frequency component from the signal from the sector information and a high-pass filter for extracting high frequency component of the continuous information derived from the dedicated servo disc. The two signals are then added together.

SUMMARY OF THE INVENTION

In accordance with a new and improved servo system of the present invention, which increases positioning accuracy, the servo system has means for generating a first continuous position signal, and a second position signal derived from the servo information embedded in sectors of data disc surfaces. The servo system further comprises means for forming a hybrid signal based upon the first and second signal such that when the second signal is generated, the hybrid signal is the second signal. Finally, servo control circuits means control the movement of accessing heads in response to the hybrid signal.

DETAILED DESCRIPTION OF THE DRAWINGS

Figure 1:
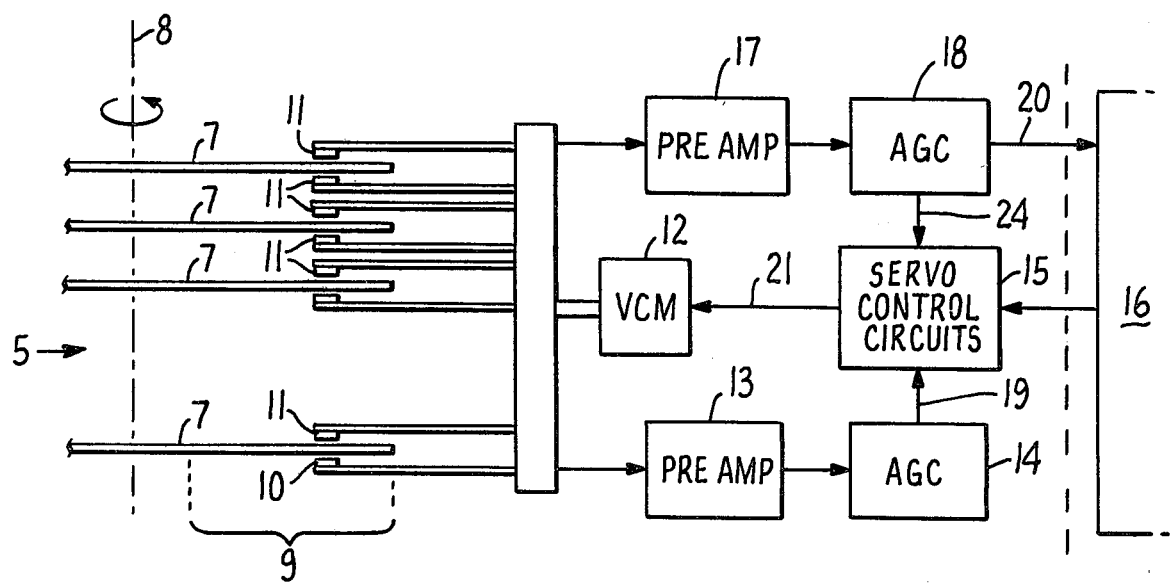
FIG. 1 shows in block diagram form a data storage apparatus incorporating the present invention.

Referring to FIG. 1, there is shown a block diagram of the storage apparatus 5 incorporating the servo system of the present invention. A stack of magnetic recording discs 7 are mounted for rotation on a central spindle 8. Pre-recorded servo tracks 9 are provided over one surface of one of the discs, in this case the lowest disc in the stack, and are read by an associated read-only servo head 10. Since this surface contains only servo information, it is referred to as a dedicated servo surface. The dedicated servo surface contains the information regarding the position of data tracks on the remaining surface of the discs which are accessed by a number of data recording and playback heads (hereinafter: data heads) 11, one being provided for each of the remaining disc surfaces. The data heads 11 and the servo head 10 are all ganged together for movement to and fro over the disc surfaces by actuator mechanism 12.

The continuous position signal derived by the servo head 10 reading the pre-recorded servo information 9 on the dedicated servo surface is used alone to provide positioning information during track accessing operations. This positioning information takes the form of track crossing pulses derived from the error signal by the servo control circuits 15 after being passed through conventional first preamplifier 13 and a first AGC amplifier 14. The address of the destination track is supplied to the control circuits 15 from an external control system 16 and from this information the servo control circuits 15 produce the necessary drive currents for the actuator mechanism 12 so that the data heads are moved to the desired destination track following a predetermined velocity profile.

The actual servo circuitry used for controlling track access in the apparatus of the preferred embodiment is well known and will not be described hereinafter.

Figure 2:
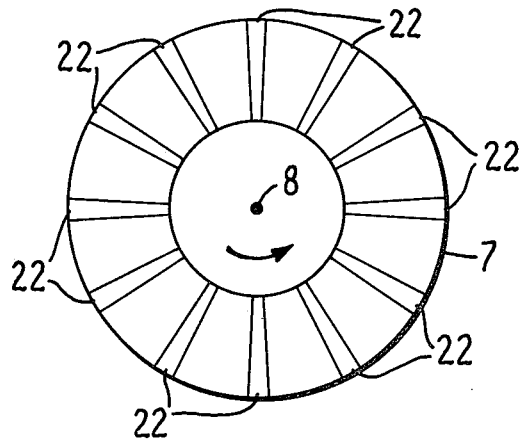
FIG. 2 is a top view of a data disc used in the storage apparatus of FIG. 1 showing in exaggerated schematic form servo information embedded in sectors.

Once the data heads 11 arrive at the desired track position, during track following operations the position signal required to maintain the data heads 11 accurately on track is derived primarily from the servo information pre-recorded in sectors around the data track itself. Referring to FIG. 2, there is shown greatly exaggerated a plurality of pre-recorded sectors 22 containing servo information in a data disc 7. The number of servo sectors 22 and their size are shown exaggerated and are for illustration purposes only. Typically, the servo information in disc surface 7 is pre-recorded in 32 equally spaced servo sectors 22 around the data track.

The "on-track" position is when the servo head lies centrally spaced about two pre-recorded servo tracks. If the head is off-track an error signal is developed which after suitable processing is used to control drive current to the actuator mechanism 12 and thus form a closed loop track following system.

As in the case of the servo pattern on the dedicated surface, the precise nature of the servo encoded pattern used to write the sectored servo tracks has no special bearing on this invention. Any method of encoding which produces an error signal indicating by its magnitude and polarity the degree and direction of off-set from the true on-track position can be used. There are, of course, many suitable alternatives described in the prior art and therefore it is not necessary for a description of the encoding of the sectored servo information to be included in this specification.

Data and servo information read by a selected data head 11 is passed through conventional second preamplifier 17 and a second AGC amplifier 18. The selection of the data head 11 may be by any of the known conventional head selection methods. The sectored servo information which contains the DC and low frequency information of the position of the selected data head 11 is combined with the information derived from the dedicated servo surface in the servo control circuit 15. The resulting combined signal is then used to produce suitable drive currents to control the actuator mechanism 12 in a known manner. The signals from the second AGC amplifier 18 are also passed along data channel 20 to the control system 16 so that the data recorded between sectors can be processed in the usual way.

Figure 3:
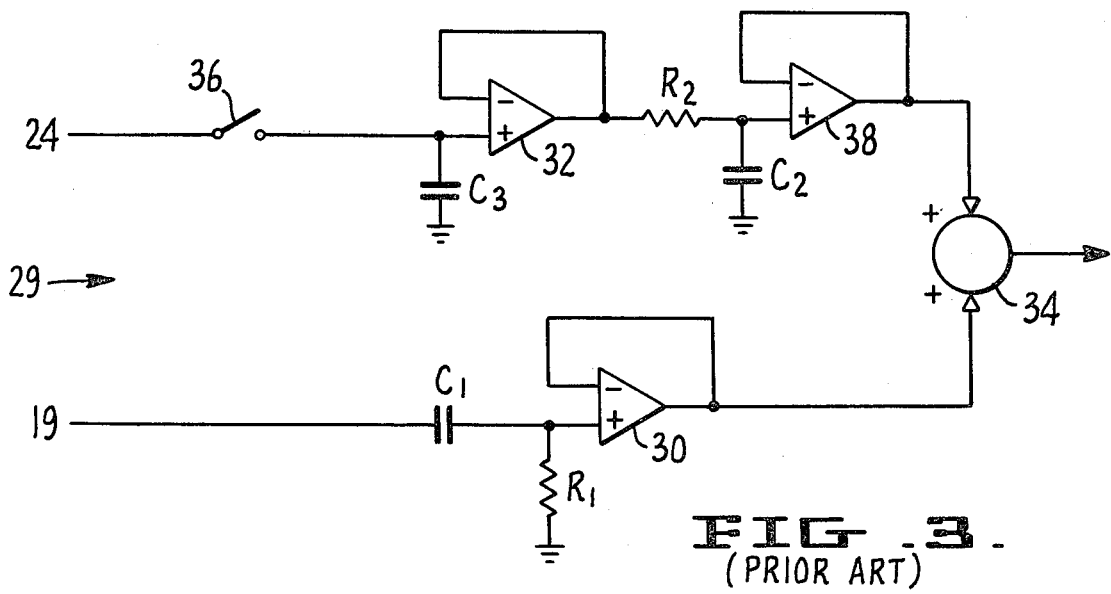
FIG. 3 shows the details of the servo system of the prior art.

Referring to FIG. 3, there is shown a servo system 29 of the prior art. The servo system 29 is a portion of the servo control circuit 15. The first continuous position signal from the first AGC amplifier 14 is entered into the servo system 29 via the first input line 19. An $R_1C_1$ circuit is used to pass the high frequency component of the first continuous position signal which is then amplified by the first operational amplifier 30. The output of the first operational amplifier 30 is tied to the negative input to the first operational amplifier 30 producing a unity gain. The second position signal from the second AGC amplifier 18 is entered into the servo system 29 via second input line 24. The sampling nature of the sectors provides a low frequency pass filter for the second position signal. The capacitor $C_3$ holds the value of the second position signal from the last sector 22 during the time the data head 11 is between sectors. From the capacitor $C_3$ the signal is amplified by a second operational amplifier 32, also having unity gain. From the second operational amplifier 32 the signal passes through a $R_2C_2$ low pass filter network, and is then amplified by third operational amplifier 38, having unity gain. In practice the product of $R_1$ times $C_1$ equals the product of $R_2$ times $C_2$, thus making the aforementioned high pass and low pass filters complementary. The output from the first operational amplifier 30 and the third operational amplifier 38 are summed by the summing circuit 34 to produce a hybrid signal which is used to control the actuator mechanism 12. In FIG. 3 there is also shown a switch 36 in the servo system 29. The switch 36 is closed when the data head 11 is over a sector 22 and is accessing the embedded servo information. The closing of the switch 36 connects the capacitor $C_3$ to the error signal. The switch 36 is opened, when the data head 11 is between sectors 22, and allows the capacitor $C_3$ to hold the last value. In the operation of the servo system 29, it will be appreciated that the second position signal from the servo information embedded in the sectors 22 of the data discs 7 as read by the data heads 11, are produced only intermittently. Thus, the second position signal is fed into the servo system 29 intermittently. This is in contrast to the first position signal from the dedicated servo disc as read by the read-only head 10.

Figure 4A:
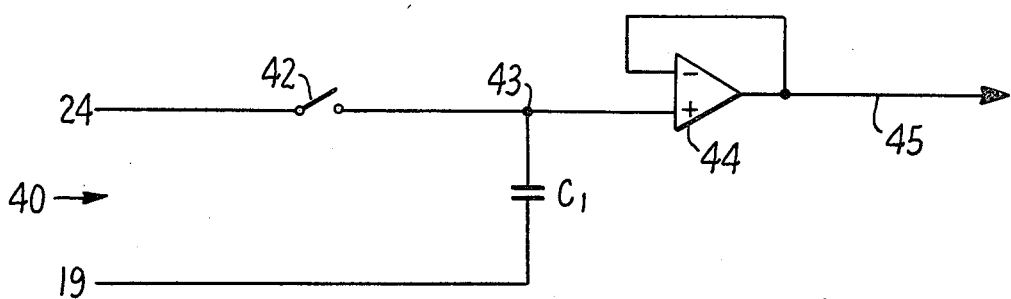
FIGS. 4(a-c) show in schematic form various embodiments of the servo system of the present invention.

Referring to FIG. 4(a) there is shown a preferred embodiment of the servo system 40 of the present invention. The second position signal from the servo information embedded in the sectors 22 of the data discs 7 is entered into the servo system 40 via second input 24 and is switched by a switch 42. The switch 42 is similar to switch 36 of FIG. 3. From the switch 42, the second position signal passes a nodal point 43 and is amplified by operational amplifier 44, having unity gain. The output of the amplifier 44 is the output 45 of the servo system 40. The first continuous position signal is entered into the servo system 40 via the first input 19. A capacitor $C_1$ is connected between the nodal point 43 and the first input 19.

The operation of the servo system 40 of the present invention is as follows:

SWITCH CLOSES

When switch 42 is closed, the second position signal appears at the nodal point 43. It is amplified by amplifier 44 and appears at output 45.

The first position signal also enters into the system 40 via first input 19. However, because the first position signal passes through an RC=O network (where R is the bare wire and is O, and C is $C_1$), this time constant is shorter than the duration that switch 42 is closed. Thus, no signal from the first position is passed through $C_1$ to the nodal point 43.

Therefore, the output 45 is of the second position signal.

SWITCH OPENS

When switch 42 is opened, $C_1$ would have stored therein the voltage difference between the second position signal and the first position signal, i.e.

$$V(C_1) = V(S) - V(D_o)$$

where
$V(C_1)$ = voltage across capacitor $C_1$,
$V(S)$ = last voltage from second position signal before switch 42 is opened
$V(D_o)$ = voltage from first continuous signal, just before switch 42 is opened.

As the data head 11 travels between sectors 22, the first position signal may vary. The signal would be $$V(D) = V(D_o) + \Delta V(D)$$

where $V(D)$ = voltage of the first signal between the sectors 22
$V(D_o)$ = as above described
$\Delta V(D)$ = change in the first signal from the value of the first signal just before switch 42 is open.

$V(C_1)$ is always the voltage difference between nodal point 43 and first signal. Therefore $$V(C_1) = x - V(D)$$

where x is voltage at nodal point 43 when switch 42 is open.
or $$V(C_1) = x - V(D) = V(S) - V(D_o)$$

$$x - (V(D_o) + \Delta V(D)) = V(S) - V(D_o)$$

$$x = V(S) + \Delta V(D)$$

In other words, the signal which appears at nodal point 43 or the output 45 to system 40, when switch 42 is open, is the sum of
(1) $V(S)$—last known second position signal and
(2) $\Delta V(D)$—change in the first signal from the value of the first signal just before switch 42 is open.

Figure 4B:
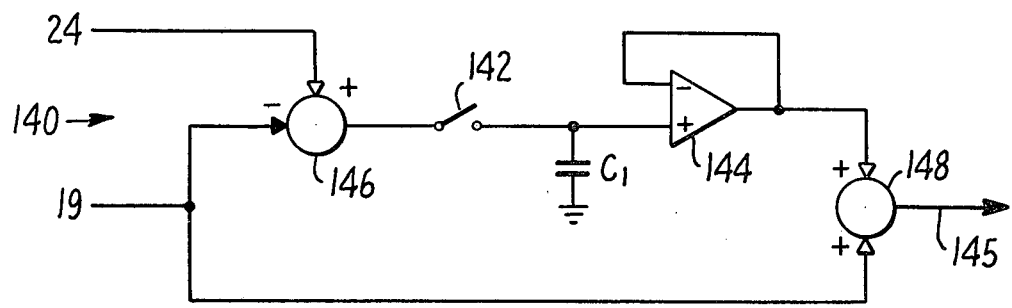

Referring to FIG. 4(b) there is shown another embodiment of the servo system 140 of the present invention. The second position signal is entered into the system 140 via second input 24. The second signal is entered into a subtractor 146. The first signal enters into the system 140 via first input 19. The first signal also enters into the subtractor 146. The output of the subtractor 146 is the second signal minus the first signal, and is switched by switch 142. Switch 142 is similar to switch 42. From the switch 142, the signal passes through a sample and hold circuit comprising of a capacitor $C_1$ and an operational amplifier 144, having unity gain. From the amplifier 144, the signal enters into a summing means 148. The first signal also enters directly into the summing means 148. The output 145 of the system 140 is the output of the summing means 148.

Using the definitions and symbols set forth hereinabove, the following shows the operation of the system 140 of the present invention.

SWITCH CLOSES

When switch 142 is closed, the output from the operational amplifier 144, i.e.

$$V(S) - V(D)$$

is entered into the summing means 148. The first signal, i.e. $V(D)$, also enters into the summing means 148. Therefore, the output 145, when switch 142 is closed, is $V(S) - V(D) + V(D) = V(S)$ or is the second signal.

SWITCH OPENS

When switch 142 opens, the voltage across $C_1$ would be $$V(S) - V(D_o)$$

and this would enter the summing means 148. First signal $$V(D) = V(D_o) + \Delta V(D)$$

would also enter into the summing means 148. The output 145 would be $$V(S) - V(D_o) + V(D_o) + \Delta V(D)$$

or $$V(S) + \Delta V(D)$$

Figure 4C:
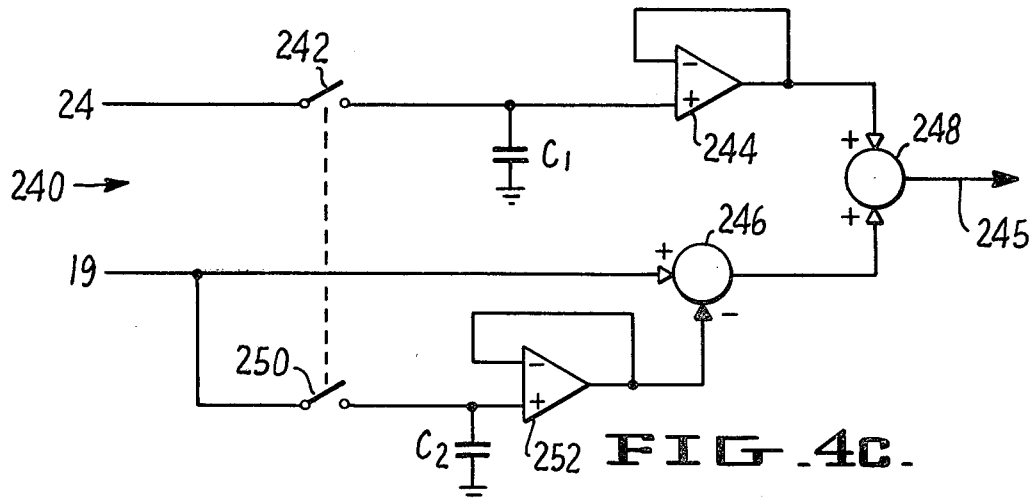

Referring to FIG. 4(c), there is shown yet another embodiment of the servo system 240 of the present invention. The second position signal from the servo information embedded in the sectors 22 of the data discs 7 is entered into the servo system 240 via second input 24 and passes through a second switch 242. Second switch 242 is similar to switch 36 of FIG. 3. A capacitor $C_1$ provides a sample and hold function for the second position signal. The second position signal is then amplified by second operational amplifier 244, having unity gain. The amplified signal from the second operational amplifier 244 is entered into a summing means 248. The summing means 248 is the same as the summing means 34 of FIG. 3. The first continuous position signal is entered into the servo system 240 via the first input 19. The first signal enters into a subtractor 246. The first signal is also switched by a first switch 250 which is similar to the second switch 242. The first switch 250 is switched in tandem with the second switch 242, i.e. when the second switch 242 is engaged, the first switch 250 is also engaged. This means that the first switch 250 is turned on whenever the data heads 11 generate a second position signal derived from the servo information embedded in the sectors 22 of the data discs 7. After the first switch 250, the first signal is connected to a capacitor $C_2$. The first signal is then connected into a first operational amplifier 252, having a gain of unity. The output of the first operational amplifier 252 is entered into the subtractor 246. The subtractor 246 subtracts the signal from the output of the first operational amplifier 252 from the first signal directly inputted via the first input 19 to produce a modified first signal. The modified first signal is entered into the summing means 248 along with the second signal to produce the output 245 of the system 240.

During the operation of the system 240 of the present invention, the following occurs:

SWITCHES CLOSES

When switches 242 and 250 close, the input to the summing means from the second operational amplifier 244 is $V(S)$. The output of the subtractor, however, is zero. Thus, the output 245 of the system 240 is $V(S)$.

SWITCHES OPEN

When switches 242 and 250 open, the Capacitor $C_1$ would have stored therein $V(S)$ which is entered into the summing means 248. $C_2$ would have stored therein $V(D_o)$. The first signal would be $$V(D) = V(D_o) + \Delta V(D)$$

The output of the subtractor would be $$= V(D) - V(D_o)$$
$$= V(D_o) + \Delta V(D) - V(D_o)$$
$$= \Delta V(D)$$

which is also entered into the summing means 248. The output 245 to the system 240 would then be

V(S)+ΔV(D)

Figure 5A:
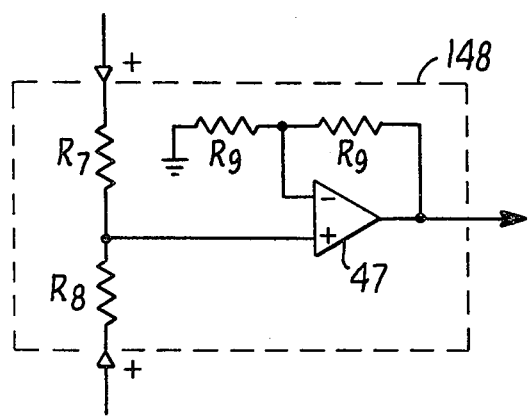
FIGS. 5(a-b) show in detailed circuit form portions of the servo system of the present invention.

Referring to FIG. 5a, there is shown in detail the summing means 148 or 248 of FIGS. 4(b) or 4(c). One signal enters via a resistor $R_8$ into the plus input of the operational amplifier 47. Another signal passes through a resistor $R_7$ and is also inputted into the plus side of the operational amplifier 47. The output of the operational amplifier 47 is tied back to the negative input of the operational amplifier 47 thru resistor $R_9$ and then to ground thru another resistor $R_9$. Resistors $R_7$, $R_8$ and $R_9$ are all equal, forming a net gain of unity.

Figure 5B:
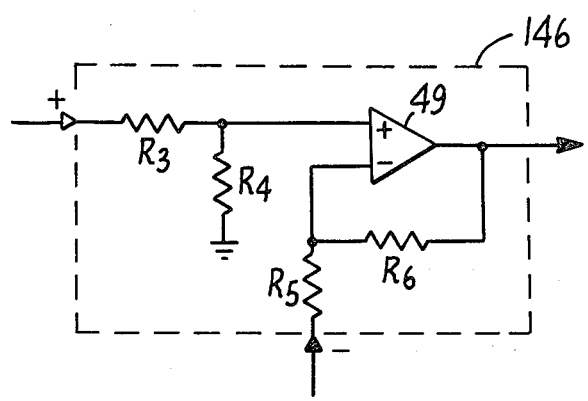

Referring to FIG. 5b, there is shown in greater detail the subtractor 146 or 246 of FIGS. 4(b) or 4(c). A signal enters through a resistive network comprising of $R_3$ and $R_4$ and is entered into the plus side of the operational amplifier 49. Another signal is entered via resistive network R5 and R6 into the subtractive input of operational amplifier 49. Resistors $R_3$, $R_4$, $R_5$ and $R_6$ are all equal and the gain is therefore unity with the appropriate polarities.

It can be seen from the foregoing discussion that the servo systems 40, 140 and 240 of the present invention all have the same operating characteristics.

When the the data head 11 reads the servo information embedded in the sectors 22 of the data disc 7 and generates a second signal, the output of the servo system, which is used to control the actuator 12, is the second signal.

When the data heads 11 are no longer over the sectors 22 containing the embedded servo information or when the data heads 11 malfunction and do not generate a second position signal, the signal used to control the actuator 12 is based upon a modified first continuous position signal, which indicates how much positioning movement has occurred since the last time the data heads 11 were on a sector 22 and were generating a second positioning signal therefrom, and the last known position of the data heads 11.

Moreover, the frequency response of the servo systems 40, 140 and 240 of the present invention, are mathematically the same. It can be shown that the transfer function of the output 45, 145 or 245 will be the following $$\frac{output(S)}{E(S)} = \frac{1 - e^{-ST}}{S}$$

$$\frac{output(S)}{D(S)} = \frac{S - 1 + e^{-ST}}{S}$$

where S=jw
output(S)=frequency response of output 45, 145 or 245 as a function of S
T=time period when data head 11 is between sectors 22
E(S)=signal from servo sector 22, has a function of S
D(S)=signal from dedicated disc, as a function of S
The net Laplace transformation of the total system 40, 140 or 240 would be $$output(S) = \frac{1 - e^{-ST}}{S} \times E(S) + \frac{S - 1 + e^{-ST}}{S} \times D(S)$$

There are many advantages to the servo system 40 of the present invention.

For ease of understanding the comparison between the servo system of the prior art and of the present invention will be made with reference to servo system 240, as shown in FIG. 4(c). However, as noted hereinabove, the servo systems 40, 140 and 240 are functionally equivalent and have the same frequency response and in fact servo system 40, as shown in FIG. 4(a) is the preferred embodiment due to its simplicity.

First, the positioning accuracy of the track location is inherently greater. As explained previously, the sampling nature of the sector servo information provides a low pass filter for the embedded data. The invention provides an exactly complementary high pass filter on the dedicated servo head 10 readback 19. This exact complementary matching is inherent in the invention and can be seen at the output of the subtractor 246 in the configuration shown in FIG. 4(c). The subtractor 246 takes a signal 19 and subtracts a signal output from 252, which is the output of a sampler (comprising a capacitor $C_2$ and operational amplifier 252) identical in operation to the sampler that operates on the sector information (comprising capacitor $C_1$ and operational amplifier 244). Thus, the output of subtractor 246 is the input signal 19 minus the signal passed by the sampler and will contain the high frequency characteristics not passed by the sampler. When the high frequency passed by subtractor 246 is added to the output of 244, which contains only low frequency components, the exact frequency matching is performed.

The present invention provides a means to operate on the entire frequency spectrum of the sectored servo information and eliminates the low pass filter formed by $R_2C_2$ in the prior art, thereby maximizing the positioning accuracy of the selected data head 11 to the corresponding data surface 7. The present invention also increases the positioning accuracy of the data head 11 by substantially reducing the low frequency content of the dedicated servo signal passed to the output 245. Thus, the present invention provides greatly improved positioning accuracy over the prior art for increasing the frequency content of the sectored servo signal in the output 245 and by reducing the frequency content of the dedicated servo signal in the output 245.

Secondly, the information derived by the servo system 40, 140 or 240 of the present invention is more useful in that it tells the actuator 12 how much the data heads 11 have moved relative to the last known position plus the last known position. The problem of accuracy is best illustrated by the following example. In the event the data heads 11 miss a sector 22 or simply do not generate a second positioning signal, the signal produced by the control circuit of the present invention will simply be a modified first signal derived from the subtractor 246, which tells how much the data heads 11 have moved relative to the last known position, as evidenced by the last time the second position signal was generated plus the last known position of data head 11 as stored in $C_1$. On the other hand, in the apparatus of the prior art as shown in FIG. 3, because there is a high frequency pass filter of $R_2C_2$, in the event a data head 11 misses a sector, the output as produced by the hybrid signal from the summing means 34 would be of an exponentially decaying signal from the first operational amplifier 30. This would produce an erroneous signal.

Finally, it should be appreciated that the first continuous position signal entered into the servo system of the present invention need not be the output from a dedicated servo disc. Another example of continuous position information generating broad band information is a signal derived from base plate transducer. In the servo system of the present invention, the absolute position accuracy of the information signal from the continuous position signal is not critical. In the servo system of the present invention, only the relative movement of the data heads 11 is important. So long as there are second position signals embedded in sectors of the discs' surfaces to update the position signals and so long as the stability and repeatability of the continuous signal is maintained, many different sources for the first continuous position signal may be used.

What is claimed is:

1. A servo system in a disc drive for accessing a selected data track on a disc surface and for following said selected data track as the disc surface is rotated, wherein the disc surface having data information thereon also has servo information in sectors of said surface, said servo system having accessing means including a movable magnetic head coupled to an actuator that is responsive to a servo signal, comprising:

means for generating a first continuous position signal;
   means for generating a second position signal, derived from servo information in sectors of said surface;
   means for forming an output signal based upon said first signal and said second signal;
   said output signal being said second signal when said second position signal is generated;
   said output signal being the sum of a modified first position signal and a stored second position signal when said second position signal is not generated;
   said modified first position signal being the difference between the first signal generated and the first signal generated when the second position signal was also generated;
   said stored second position signal being said second position signal when the second position signal was generated; and
   servo control circuit means for controlling the movement of said accessing means in response to said output signal.

2. The system of claim 1 wherein said first signal is derived from a disc having dedicated servo information 3. In a servo system in a disc drive for accessing selected data tracks on disc surfaces and for following selected data tracks as the disc surfaces are rotated, one of such disc surfaces being dedicated to servo information, and each of the other disc surfaces having data information and servo information in sectors, said servo system having accessing means including movable magnetic heads coupled to an actuator that is responsive to servo signals, first generating means for generating a first continuous position signal derived from said dedicated servo disc surface, second generating means for generating a second position signal derived from servo information in sectors of each of said other disc surfaces, and servo control circuit means for controlling the movement of said accessing means in response to an output signal; wherein the improvement to said servo system comprises:

means for forming said output signal based upon said first and second signals;
   said output signal being said second signal when said second position signal is generated;
   said output signal being the sum of a modified first position signal and a stored second position signal when said second position signal is not generated;
   said modified first position signal being the difference between the first signal generated and the first signal generated when the second position signal was also generated;
   said stored second position signal being said second position signal when the second position signal was generated.

4. The servo system of claim 1 or 3 wherein said forming means has a net transfer function of $$\text{output}(S) = \frac{1 - e^{-ST}}{S} \times E(S) + \frac{S - 1 + e^{-ST}}{S} \times D(S)$$

where
$S = jw$
output(S) = the frequency response of the output signal
T = the time period between the generation of second signal frequency response of
E(S) = frequency response of second signal
D(S) = frequency response of first signal.

* * * * *